United States Patent [19]
Wirt et al.

[11] Patent Number: 4,858,003
[45] Date of Patent: Aug. 15, 1989

[54] MECHANISM FOR HANDLING SLIDES AND FILM STRIPS

[75] Inventors: Michael L. Wirt, Avon; Jude Sangregory, Rochester; Mark E. Bridges, Spencerport, all of N.Y.

[73] Assignee: Eastman Kodak Company, Rochester, N.Y.

[21] Appl. No.: 142,991

[22] Filed: Jan. 12, 1988

[51] Int. Cl.[4] ............................................. G03B 1/50
[52] U.S. Cl. ................................... 358/102; 353/95; 353/120
[58] Field of Search ........... 353/95, 108, 120, DIG. 5; 358/102

[56] References Cited

U.S. PATENT DOCUMENTS

| | | | |
|---|---|---|---|
| 1,465,353 | 8/1923 | Donaldson | 353/120 |
| 3,232,167 | 2/1966 | Schwartz | 353/120 |
| 3,242,605 | 3/1966 | Kleinschmidt | 353/120 |
| 3,539,715 | 11/1970 | Lemelson | 358/102 |
| 3,871,758 | 3/1975 | Lemelson | 353/120 |
| 3,905,694 | 9/1975 | Miragliotta | 353/120 |
| 4,417,792 | 11/1983 | Martin, geb. Böser | 353/120 |
| 4,506,300 | 3/1985 | Fearnside | 358/102 |

Primary Examiner—Howard W. Britton
Attorney, Agent, or Firm—Robert H. Sproule

[57] ABSTRACT

Apparatus (10) for positioning film media (30, 50) in alignment with a video imager includes a frame having a window (28), a primary gate (12) mounted on the frame for holding film media in a first plane, a secondary gate (13) mounted on the frame for holding film media in a second plane, and a sensor (14) for detecting the presence or absence of film media whereby the video imager is caused to move with respect to the primary and secondary gates to focus on the film media. A carrier (61) comprising a base (80) and cover (81) is provided with a channel (83) for filmstrips (50). The base and cover snap together for the removal and insertion of filmstrips. A plurality of notches (78) are associated with each frame (76) for accurate positioning of the filmstrip.

14 Claims, 3 Drawing Sheets

MECHANISM FOR HANDLING SLIDES AND FILM STRIPS

TECHNICAL FIELD

The present invention is related generally to apparatus for transferring silver halide images into signals for projection onto a television screen or storage on video recording devices. More particularly, the present invention provides a film carrier mechanism which can hold slides as well as film-strips, presenting each frame in front of a lens and video sensor.

BACKGROUND ART

With the continued development and availability of video recording/playback equipment, an interest in the conversion of images stored on filmstrips and slides into video signals has developed. Video sensors and related video processing electronics are known which convert silver halide images to video signals which can be stored and played back as desired. By storing a plurality of these images, the need for employing projectors, screens and large number of slides can be reduced to a single video tape cartridge that can be readily viewed with any video playback unit, or VCR, of the proper format and a television.

Such devices are useful first for the conversion of existing libraries of slides and filmstrips which may be very bulky as well as old and valuable. Also, given the high quality and resolution of 35 mm cameras, it is possible to capture still images of various objects in significantly higher quality than by using existing video cameras. Yet, when these images from either source are stored on video tape, they can be readily and conveniently viewed for commercial use, entertainment as well as educational purposes.

In order to convert filmstrips and slides into video signals, the silver halide image is properly illuminated and positioned directly in front of the video sensor which scans and converts the image before it. When it is desired to convert many such images comprising perhaps hundreds of separate frames, a mechanism is required that can present the strips and slides accurately, repeatedly, and readily before the sensor.

While apparatus is available for such conversion of filmstrips and slides into electronic signals for magnetic storage, the known devices may not be capable of handling both filmstrips and slides, and the means for presenting a plurality of frames in a single position for rapid focusing and imaging have left much to be desired. Devices for transporting and positioning film strips and slides are known for a variety of projection equipment which must also locate a frame, in this instance, between a source of illumination and a lens, for viewing.

One manner by which a filmstrip can be correctly and separately positioned is by employing a notch at regular intervals which allows the strip to stop in proper registry. U.S. Pat. No. 3,232,167, for instance, provides a sound scanning assembly for a filmstrip projector. The filmstrip provides a plurality of picture areas and associated sound recording areas therebetween. A like plurality of notches are cut in one of the longitudinal edges of the strip, each notch being associated with a single sound area. The notches provide that one sound recording will be presented with one picture and they also control the transport mechanism for the sound scanning mechanism. Thus, the notches are employed to open and close a switch which, in turn, allows a scanning drum to travel axially in relation to the filmstrip as it moves transversely thereacross.

U.S. Pat. No. 3,905,694 provides a slide projector. A slide train is employed for carrying a plurality of linked slides and the train carries a plurality of notches by which one of several lugs, manually driven, advance the slides into illumination and projection.

Despite the existence of such carriers for the projection of filmstrips and slides, there exists a need for an apparatus that allows for the movement and positioning of multiple frames in video processing equipment. Such equipment provides a video processor and requires that it be positioned automatically in separate planes for filmstrips and for slides.

DISCLOSURE OF THE INVENTION

It is, therefore, an object of the present invention to provide an apparatus for receiving and holding film media in equipment for video processing.

It is another object of the present invention to provide an apparatus that can handle filmstrips and slides.

It is yet another object of the present invention to provide an apparatus that signals the video processing equipment of the presence of film media and whether the media is a filmstrip or slide.

It is still another object of the present invention to provide a carrier for filmstrips that can be employed with the aforesaid apparatus.

These and other objects, together with the advantages thereof over known apparatus, which shall become apparent from the specification which follows, are accomplished by the invention as hereinafter described and claimed.

In general, apparatus for positioning film media in alignment with video imaging means comprises frame means having a window, primary gate means mounted on the frame means for holding film media in a first plane, secondary gate means mounted on the frame means for holding film media in a second plane, and, sensor means for detecting the presence or absence of film media whereby the video imaging means is caused to move with respect to the primary and secondary gate means to focus on the film media.

The present invention also provides a carrier which comprises base means providing a channel for receipt of the filmstrip and a plurality of frame windows corresponding to the frames on the filmstrip, provided in the channel; cover means providing a plurality of frame windows corresponding to the frames on the filmstrip and, fastening means provided on the base and cover means whereby the base and cover means can be snapped together to hold a filmstrip therein.

PREFERRED MODE FOR CARRYING OUT THE INVENTION

Figure 1:
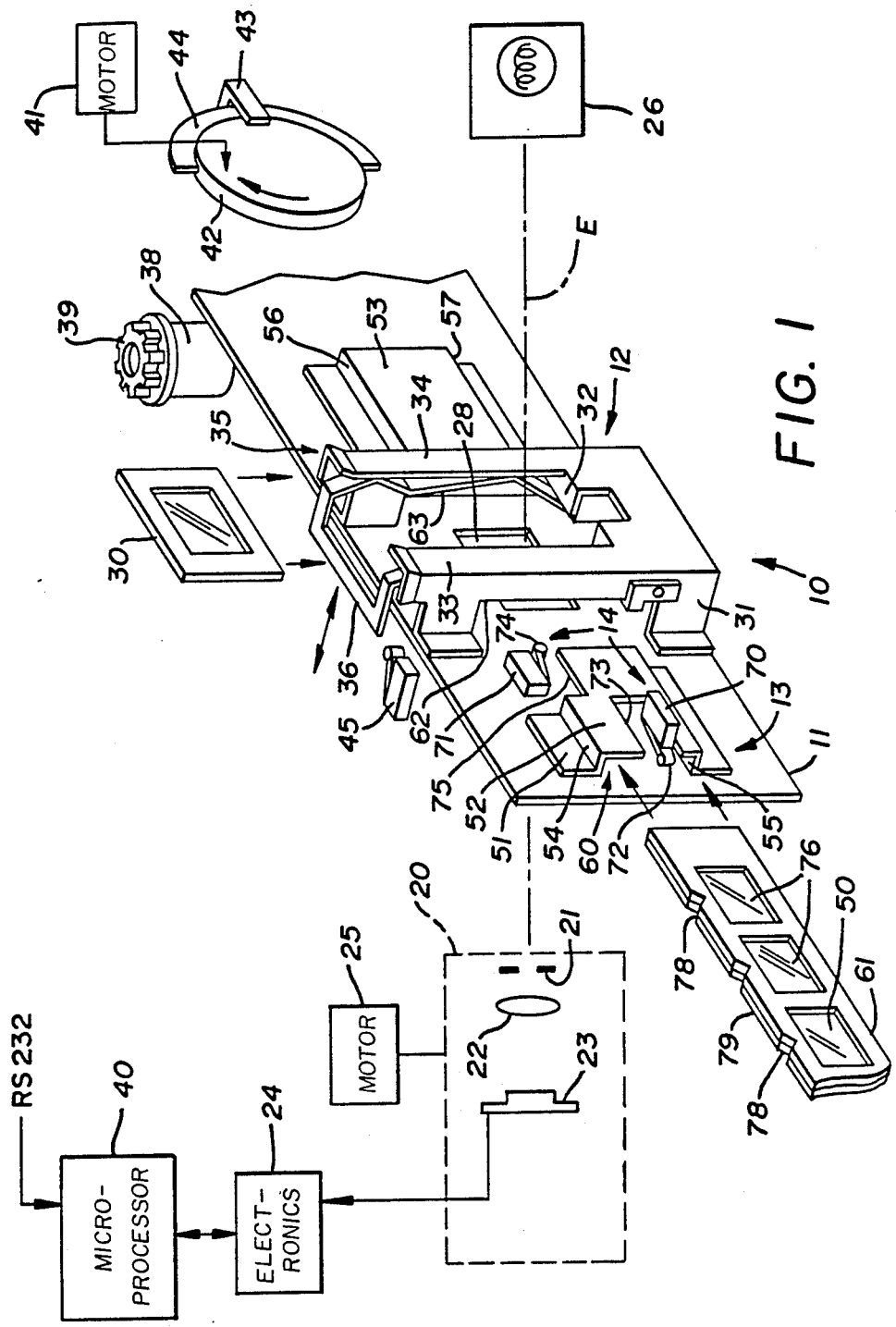
FIG. 1 is a perspective view of the apparatus of the present invention, in conjunction with circuitry and related structure depicted schematically for producing video images.

As noted hereinabove, film media such as slides carrying positive silver halide images and filmstrips carrying negative or positive silver halide images can be converted to digital signals via video processing equipment which signals can then be directed to television or related viewing equipment or to a video recorder. The video processing equipment includes a lens and a video sensor which can be positioned to focus on a frame of the film media. In addition to focusing and alignment, the video processing equipment can also zoom in on the film media as well as rotate along an axis of alignment passing between the video processor and the frame being scanned or imaged.

The apparatus of the present invention is particularly useful with such video processing equipment where it serves quickly to signal the type of film media and plane of focus, as will become apparent later, and also to hold the individual frames firmly, in optical alignment with the sensor mechanism. Of course, the apparatus of the present invention can find use with other video processing equipment and thus, its use is not to be limited solely to any specific type thereof.

The apparatus for positioning film media according to the present invention is depicted in the drawings by the numeral 10. It includes generally a frame member 11, primary gate means 12 for holding film media in a first plane, secondary gate means 13 for holding film media in a second plane and sensor means 14 for detecting the presence or absense of film media whereby the video imaging means can focus on the film media.

In FIG. 1, the apparatus 10 has been depicted with a schematic diagram of a mechanism for converting film images to video signals, indicated generally by the numeral 20. Mechanism 20, in turn, provides an aperture 21 for controlling the amount of light; a lens 22 for focusing the film media; a video sensor 23 and video processing electronics 24. A focusing motor 25 is also provided for moving the mechanism 20 to focus on at least the first and second planes. As will be appreciated by those skilled in the art, the mechanism 20 has been greatly simplified herein. Thus, additional drive motors (not shown) can be provided to move the mechanism 20 horizontally or along the X-axis; vertically or along the Y-axis; and rotationally. Zooming is also possible and requires movement of the mechanism 20 toward and away from the film media or along the Z-axis while at the same time changing the relative distance between the lens 22 and video sensor 23. A motor can also be provided to open and close the aperture 21 which can be controlled manually or automatically as is known in the art. Of course, it should be appreciated that the present apparatus 10 is not necessarily limited by any particular mechanism 20.

A suitable illumination source 26 is provided "behind" the apparatus 10 so that the film media carried therein can be scanned and imaged by the mechanisms 20. The light and film image are "projected" through a window 28, provided in frame 11. As should begin to be evident, complicated slide and film handling can be avoided by holding the film media simply and stationary in the apparatus 10 and moving the lens and sensor relative to the film media.

One type of film media is slides 30 which are held in primary gate means 12. Primary gate means 12 comprises a housing 31 mounted on the frame 11 by welding or screws or other suitable means not shown. The housing 31 is open at the rear and provides shelf 32 and vertical walls 33 and 34 which together form a gate 35 for receipt of a slide 30. A spring material pressure pad 36 yields for insertion and removal of slides 30 and holds each firmly within gate 35.

The slides 30 are gravity fed from a Kodak Carousel 80 Slide Tray, or equivalent, into slide gate 35 where they are clamped into place by pressure pad 36. A tray motor 38 turns sprocket 39 which engages pins on the underside of the slide tray to access slides randomly upon user input through a front panel control (not shown) or an RS-232 input associated with a microprocessor 40. A cam motor 41 rotates a cam 42 which actuates levers for the functions of slide lift, slide registration, tray location and slide clamp. These levers are not shown in FIG. 1 but all operate functions at the slide gate 35. An optical sensor 43 senses the presence or absence of blade 44 on the cam to control start up and shut down of the cam motor during the slide change sequence. Zero position switch 45 detects a notch in the slide tray to verify when the slide tray zero position is lined up with the slide gate.

All of the foregoing components are well known in the art and can be found in various combinations in existing slide projectors. Accordingly, further explanation is not necessary except to summarize that the apparatus 10 handles slides 30 from a tray containing a plurality thereof which can be moved to feed any and all of the slides into the primary gate means 12 individually upon command. The slides can be inserted and removed remotely and automatically in numerical sequence or in any other desired sequence by appropriately entering commands to the microprocessor 40.

The second type of film media includes filmstrips 50 which are entered into secondary gate means 13 which can also receive slides as will be described hereinbelow. Secondary gate means 13 is employed to increase the capacity of the apparatus 10 to receive other film media. In order to simplify handling of both types of film media the secondary gate means 13 is provided in a second plan separate from the first plan associated with the primary gate means 12.

Secondary gate means 13 also comprises a housing 51, which is mounted on the frame 11 in similar fashion as the housing 31. As is evident in FIG. 1, the housing 51 is provided in two sections, an inboard or receiving end 52, located laterally of the window 28 and primary gate means 12, and an outboard or exit end 53 located laterally opposite receiving end 52 and the other side of window 28 and primary gate means 12. Of course the housing 51 is discontinuous across the gate 35 so as not to obstruct illumination and imaging of a slide 30.

The inboard end of housing 51 provides upper and lower tracks, 54 and 55 respectively, which are co-linear with upper and lower tracks, 56 and 57 respectively of the outboard end of housing 51. Together, the tracks 54–57 form a gate, generally 60, for a filmstrip carrier 61 in which the filmstrip 50 is located. The width of the tracks 54–57 is sufficient to allow passage of the filmstrip carrier 61 snugly between frame 11 and the rear walls of inboard and outboard ends 52 and 53.

With reference again to the housing 31, it will be noted that it provides side entry and exit ports, 62 and 63 respectively, for passage of the carrier 61. Also, the dimensions of housing 31 relative to housing 51 are such that gate 35 lies in a first plane A (FIG. 2) and gate 60 lies in a second plane B with respect to the window 28.

The sensor means 14 comprises microswitch 70 and optionally, microswitch 71. Microswitch 70 is provided on inboard end 52 near lower track 55 and carries an arm 72 which projects through a window 73 into the path of the film carrier 61. Microswitch 70 detects the presence of carrier 61 in the secondary gate means 13 to signal the mechanism 20 to focus on the second plane B. It can also be used as an interlock to prevent operation of the slide mechanism employed with the primary gate means 12. If it detects the carrier 61, the motor 25 is signalled to move the mechanism 20 to a fixed distance, bringing the plane B into focus.

Figure 2:
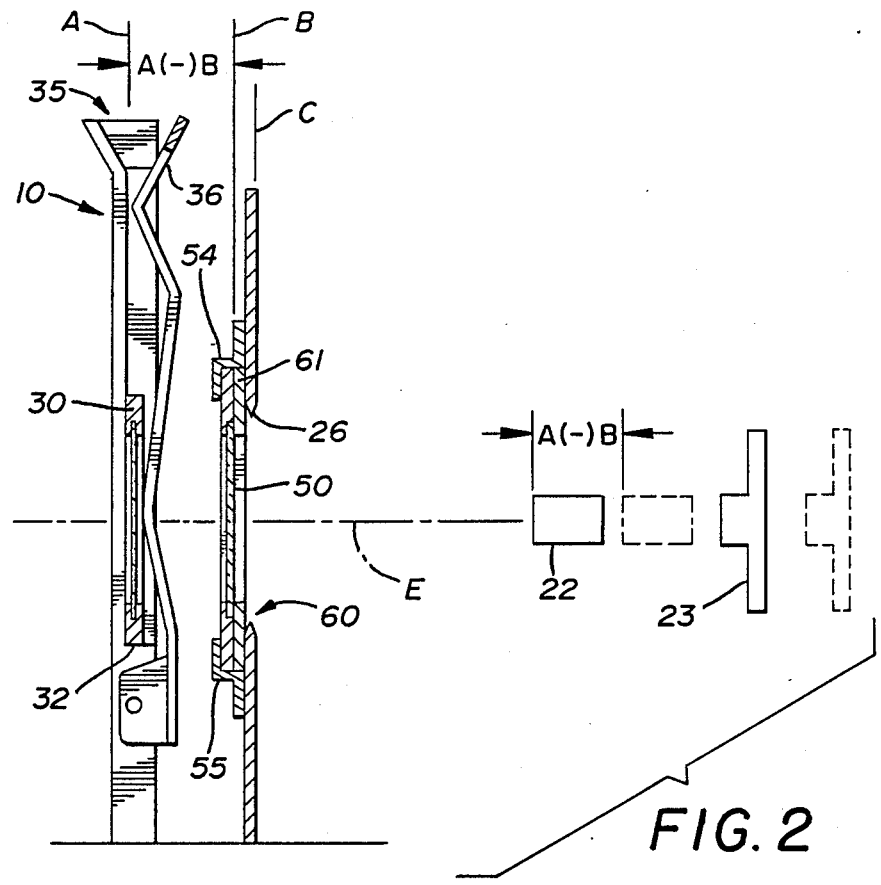
FIG. 2 is a side elevation of the apparatus of the present invention depicted in relation to a lens and sensor for video imaging.

With reference to FIG. 2, the lens 22 and sensor 23 have been depicted in solid lines and in dotted lines. An optical axis E is also depicted passing through the center of these elements as well as the window 28, and filmstrip 50 and slide 30, it being understood that in normal operation the apparatus 10 would not contain both types of film media simultaneously. In the solid line position, the lens and sensor will focus on the first plane A, focusing on a slide 30. In the dotted line position, the lens and sensor have moved back, or away from the apparatus 10 a given distance in order to focus on the second plane B. The distance between the two planes, A(-)B, is the distance of movement travelled by the lens and the sensor.

Thus, it can now be understood that the signal from microswitch 70 moves the mechanism 20 a fixed distance to focus on the second plane B. If the microswitch 70 does not detect the carrier 61, the mechanism 20 is moved to focus on the first plane A and a slide contained therein. If desired, circuitry can be employed to provide that whenever the video imaging mechanism 20 is powered up, the mechanism would be first driven to scan and focus a home position at the window plane C. At this plane, the mechanism would be aware of its location and could then shift a known distance to focus on either the first or second planes which are being described here.

Microswitch 71 is also provided on inboard end 52 but near upper track 54. It too carries an arm 74 which projects through a window 75 into the path of the film carrier 61. Individual frames 76 of filmstrip 50 are registered with optical axis E whenever the microswitch arm 74 falls into a notch 78 provided in the upper edge 79 of carrier 61. This switch not only functions as a detent for each frame 76, but also can be employed to signal the microprocessor 40 to reset the mechanism 20 and recalculate image parameters for the new frame. While the use of a notch 78 to register alignment with the optical axis E is known, it is believed to be novel to employ the detenting action to reset the mechanism 20 for each new frame 76.

Figure 3:
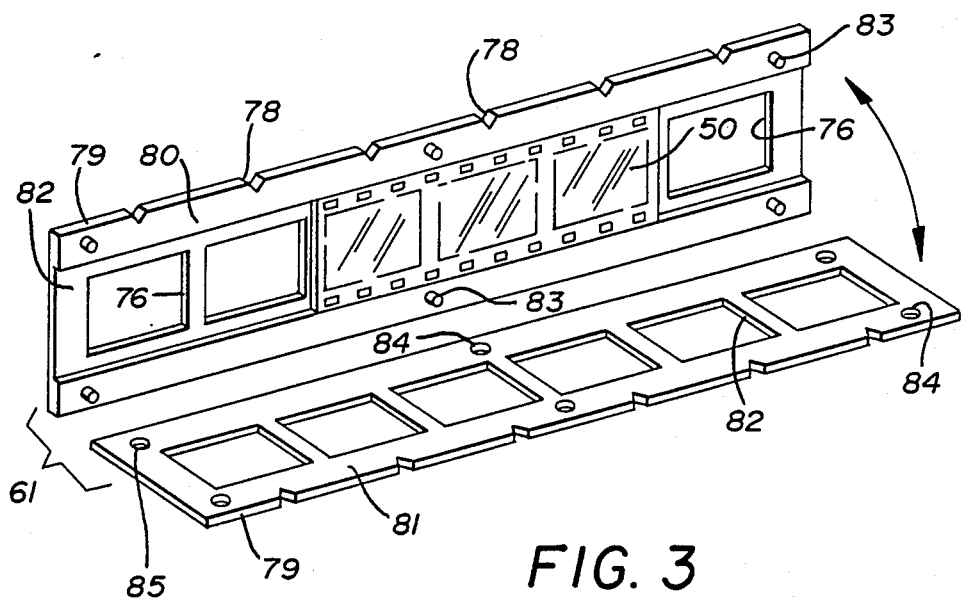
FIG. 3 is a perspective view of a carrier for filmstrips depicting the placement of film media therein; and, FIG. 4 is a perspective view of the carrier of FIG. 3, depicting schematically the function of notches provided along one edge.
Figure 4:
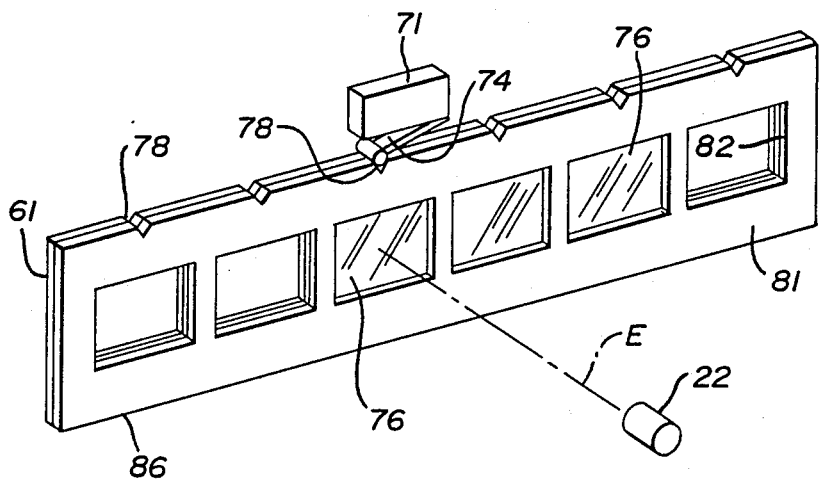

With respect next to FIGS. 3 and 4 a more complete explanation of the carrier 61 is provided. The carrier 61 is formed in two halves, a film media base 80 and a film cover 81. The base 80 has a plurality of frame windows 82 which correspond to the image spacing on a strip of positive or negative film. The filmstrip 50, depicted in FIG. 3 is received in a channel 83. The cover 81 is identical to the base 80 except for the channel 83 which is not required. The base and cover can be fabricated from a semi-rigid thermoplastic such as styrene or polycarbonate. A plurality of lugs 84 and mating recesses 85 can be molded into the opposing halves as depicted in FIG. 3 so that the carrier can be snapped together with a strip of film and readily opened to substitute another strip.

As noted hereinabove, the upper edge 79 carries a plurality of notches, engageable with the arm 74 from microswitch 71. With reference to FIG. 4, the carrier 61 is depicted apart from the apparatus 10 and shows schematically the positioning arm 74 in a specific notch 78C, which causes the frame 76C to be in alignment with optical axis E and lens 22. It is to be appreciated that practice of the present invention can also be achieved by providing notches along the lower edge 86 of the carrier and repositioning the microswitch 71.

While the operation of mechanism 10 with a carrier 61 has been detailed, it should also be understood that the film media entered and positioned in secondary gate means 13 need not be limited to filmstrips 50 as it is possible for the carrier to be modified and carry individually or in groups slides 30 that are not provided via the carousel slide tray utilized in conjunction with primary gate means 12. Furthermore, the mechanism 10 could be adapted to receive slides from a typical stack loading mechanism (not shown) or to incorporate structure for a powered filmstrip feed mechanism (also not shown). The only requirement is that the film media be provided in or with a structure that allows the microswitch 70 to signal the presence of film media in secondary gate means 13 and that each frame be brought into alignment with the optical axis E, as by contract with microswitch 71 described herein, or by counting perforations or notches in the filmstrip itself with an optical switch (not shown).

Thus, it should be clear to those skilled in the art the manner by which film media including slides and filmstrips can be positioned in alignment with video imaging equipment. It should also be clear that the apparatus 10 can employ carriers 61 as well as other means for positioning film media in the secondary gate means. It is to be understood that any variations evident fall within the scope of the claimed invention and thus, the design of the specific component elements can be determined without departing from the spirit of the invention herein disclosed and described. Moreover, the scope of the invention shall include all modifications and variations that may fall within the scope of the attached claims.

We claim:

1. Apparatus for positioning film media in alignment with video imaging means comprising:
 frame means having a window;
 primary gate means mounted on said frame means for holding film media in a first plane;
 secondary gate means mounted on said frame means for holding film media in a second plane; and
 sensor means for detecting the presence or absence of film media whereby said video imaging means is caused to move with respect to said primary and secondary gate means to focus on said film media.

2. Apparatus, as set forth in claim 1, wherein said film media associated with said primary gate means comprises a plurality of slides held in a movable, circular tray.

3. Apparatus, as set forth in claim 2, wherein said sensor means comprises a microswitch associated with the secondary gate means which prohibits operation of said primary gate means when film media is positioned therein.

4. Apparatus, as set forth in claim 1, wherein said secondary gate means is adapted to receive a carrier provided for said film media, said film media comprising filmstrips.

5. Apparatus, as set forth in claim 4, wherein said carrier comprises:
   base means providing:
   a channel for receipt of said filmstrip; and,
   a plurality of frame windows corresponding to the frames on said filmstrip, provided in said channel;
   cover means providing:
   a plurality of frame windows corresponding to the frames on said filmstrip; and,
   fastening means provided on said base and cover means whereby said base and cover means can be snapped together to hold a filmstrip therein.

6. Apparatus, as set forth in claim 5, wherein said carrier includes upper and lower edges and provides a plurality of notches along at least one edge, each said notch being associated with one said frame window.

7. Apparatus, as set forth in claim 6, wherein said sensor means comprises a microswitch engageable with said notches in said carrier when said carrier is received in said secondary gate means.

8. Apparatus, as set forth in claim 1, wherein said primary gate means is positioned behind said window and said film means.

9. Apparatus, as set forth in claim 8, wherein said secondary gate means includes inboard and outboard portions, said portions being positioned on either side of said primary gate means.

10. Apparatus, as set forth in claim 9, wherein said primary gate means provides side ports through which said film media passes when it is positioned in said secondary gate means.

11. Apparatus, as set forth in claim 10, wherein said second plane is closer to said frame means than said primary plane is.

12. Apparatus, as set forth in claim 9, wherein said sensor means comprises a microswitch associated with said secondary gate means and registrable with said film media held within.

13. Apparatus, as set forth in claim 12, wherein said inboard end of said secondary gate means includes upper and lower tracks, said sensor means being mounted adjacent said lower track.

14. Apparatus, as set forth in claim 12, wherein said sensor means further comprises a second microswitch associated with said secondary gate means to position individual frames of said film media in alignment with said window.

* * * * *